United States Patent [19]

Jacoby

[11] Patent Number: 5,768,552

[45] Date of Patent: Jun. 16, 1998

[54] GRAPHICAL REPRESENTATION OF COMPUTER NETWORK TOPOLOGY AND ACTIVITY

[75] Inventor: Ronald Jacoby, Santa Clara, Calif.

[73] Assignee: Silicon Graphics, Inc., Mountain View, Calif.

[21] Appl. No.: 687,908

[22] Filed: Jul. 30, 1996

Related U.S. Application Data

[63] Continuation of Ser. No. 87,137, Jul. 2, 1993, abandoned, which is a continuation of Ser. No. 590,670, Sep. 28, 1990, abandoned.

[51] Int. Cl.$^6$ .................................................. G06T 1/00
[52] U.S. Cl. .............. 395/334; 395/200.11; 395/118
[58] Field of Search .......................... 395/329–334, 395/348–349, 140–143

[56] References Cited

U.S. PATENT DOCUMENTS

| | | | |
|---|---|---|---|
| 4,644,468 | 2/1987 | Doster et al. | 364/200 |
| 4,775,973 | 10/1988 | Tomberlin et al. | 370/60 |
| 4,823,303 | 4/1989 | Terasawa | 364/521 |
| 4,833,592 | 5/1989 | Yamanaka | 364/138 |
| 4,887,260 | 12/1989 | Carden et al. | 370/60 |
| 4,902,469 | 2/1990 | Watson et al. | 376/259 |
| 4,974,170 | 11/1990 | Bouve et al. | 364/518 |
| 4,974,173 | 11/1990 | Stefik et al. | 395/153 |
| 5,008,853 | 4/1991 | Bly et al. | 364/900 |
| 5,021,976 | 6/1991 | Wexelblat et al. | 395/159 |
| 5,049,873 | 9/1991 | Robins et al. | 340/825.06 |
| 5,079,760 | 1/1992 | Nemirovsky | 370/17 |
| 5,097,411 | 3/1992 | Doyle et al. | 395/600 |
| 5,101,425 | 3/1992 | Darland et al. | 379/34 |
| 5,136,690 | 8/1992 | Becker et al. | 395/161 |
| 5,202,985 | 4/1993 | Goyal | 395/600 |
| 5,226,120 | 7/1993 | Brown et al. | 395/200 |
| 5,276,789 | 1/1994 | Besaw et al. | 395/140 |

OTHER PUBLICATIONS

Borg, "Visual programming and UNIX", IEEE, pp. 74–79, 1989.

"Layout Algorithm for Computer Network Management Graphics", IBM Technical Disclosure Bulletin, vol. 30, No. 12, May 1988, pp. 268–277.

Smith et al, "HP Open View Windows: A User Interface for Network Management Solutions", Hewlett–Packard Journal, Apr. 1990, pp. 60–65.

Hurst, "HP Open View Data Line Monitor", Hewlett Packard Journal, Apr. 1990, pp. 71–75.

Primary Examiner—Joseph H. Feild
Attorney, Agent, or Firm—Blakely, Sokoloff, Taylor & Zafman

[57] ABSTRACT

A means and method is disclosed for displaying an image on a display screen graphically representing the topology and information transfer activity occurring on a computer network. One host computer on the network denoted a network monitor gathers information about the topology and traffic on the network. A display image is generated depicting a substantially circular arrangement of host computers and/or sub-networks of host computers comprising the network. Color-coded, dashed, various width, or shaded line segments are added to the display image representing traffic (information transfer activity) occurring on the network between source and destination host computers. Line segments between communicating hosts are coded depending upon the volume of information being transferred. Line segments are removed when information flow between a pair of hosts ceases. Controls are provided to configure the display of the network and to move or zoom in on a portion of the display image.

79 Claims, 13 Drawing Sheets

5,768,552

GRAPHICAL REPRESENTATION OF COMPUTER NETWORK TOPOLOGY AND ACTIVITY

This is a continuation of application Ser. No. 08/087,137, filed Jul. 2, 1993, now abandoned, which is a continuation of application Ser. No. 07/590,670, filed Sep. 28, 1990, now abandoned.

BACKGROUND OF THE INVENTION

1. Field of the Invention

The present invention pertains to the field of computer networks. Specifically, the invention pertains to graphically displaying the network topology and the information interchange activity occurring on the network.

2. Prior Art

Computer networking has become a very popular and powerful form of exchanging information between host computers and other local area networks or sub-networks. In a typical network, the ability of the network to efficiently and quickly transfer data between nodes on the network is always a concern to a network administrator responsible for insuring the smooth and optimal performance of the network. The network administrator's job is complicated by the dynamic nature of computer networks. As host computers or sub-networks are added or removed from the network topology or local area networks are reconfigured, the overall network topology is often times subject to change. Moreover, the volume of information exchanged between nodes (hosts) on the network is usually unpredictable. Data interchange paths through some nodes may introduce bottlenecks while other paths are mostly dormant. Another responsibility of a network administrator is the task of load balancing for optimized information sharing between host computers.

In order for a network administrator or a network user to effectively manage or use a computer network, the administrator or user must be able to obtain timely information related to the current topology and data transfer activity occurring on the network. In the past, this information has primarily existed in the form of textual or hexadecimal dumps depicting the network information traffic patterns. In these prior art systems, it is a responsibility of the network administrator to sift through these dumps in an effort to analyze the operation of the network. Not only is this dump analysis very time consuming and expensive, but ultimately, the information gathered by this analysis is incomplete and not in real-time relation to the actual network activity. Using the prior art approach, network problems, bottle-necks, or security breaches are very difficult to detect. Further, ways of reconfiguring the network in order to alleviate a problem is more difficult to discover. A better method for computer network administration is needed.

SUMMARY OF THE INVENTION

The present invention provides a means and a method for graphically displaying on a display screen the topology and information transfer activity occurring on a computer network. The present invention enables a network administrator or a network user to visually monitor activity on the network from a central vantage point. The present invention comprises an interactive computer-controlled display system including a bus for interconnecting system components, a processor, a random access memory (RAM), a read-only memory (ROM), a data storage means for storing data, a display device including a display screen, and optionally an alphanumeric input device, a cursor control device for interactively positioning a cursor on a display screen, and a signal generation device. In addition, the computer system of the present invention includes a means for connecting the computer system to a computer network. The present invention captures packets of information traversing through the network and decodes those packets of interest. When a packet is decoded, the information obtained is appended to a network data base in the memory of a monitoring computer system. The present invention then manipulates the relevant information in the data base and generates a substantially circular graphical representation of the network topology and activity as determined by the information in the packets of information decoded. The substantially circular graphical representation may be depicted as circles, ellipses, or multi-sided polygons. A graphical depiction of network activity is then displayed on the display device.

The substantially circular graphical representation of the network topology and activity may represent a network comprising simply host computers or a network comprising mix of host computers and sub-networks or local area networks. Further, controls are provided for tailoring the display in order to target a particular type of information. The graphical representation provides means for color coding host computer images, network images, and information transfer activity images in order to highlight status and other information. For example, information transfer activity images are color coded to indicate the level of traffic flow occuring between two nodes. Traffic flow level may also be represented by varying the thickness of the lines connecting communicating hosts. In addition, coding may be used to represent categories of hosts or information packet types (i.e. TCP, ethernet, etc.).

This invention provides a means and method for overcoming the failure of prior systems of being able to graphically display network topology and activity on a computer display screen in real-time.

DETAILED DESCRIPTION OF THE PREFERRED EMBODIMENT

The present invention provides a means and method for graphically displaying the network topology and information transfer activity on a computer network. The following detailed description describes a preferred embodiment of the network analysis system of the present invention as a means for managing a computer network in this manner.

Figure 1:
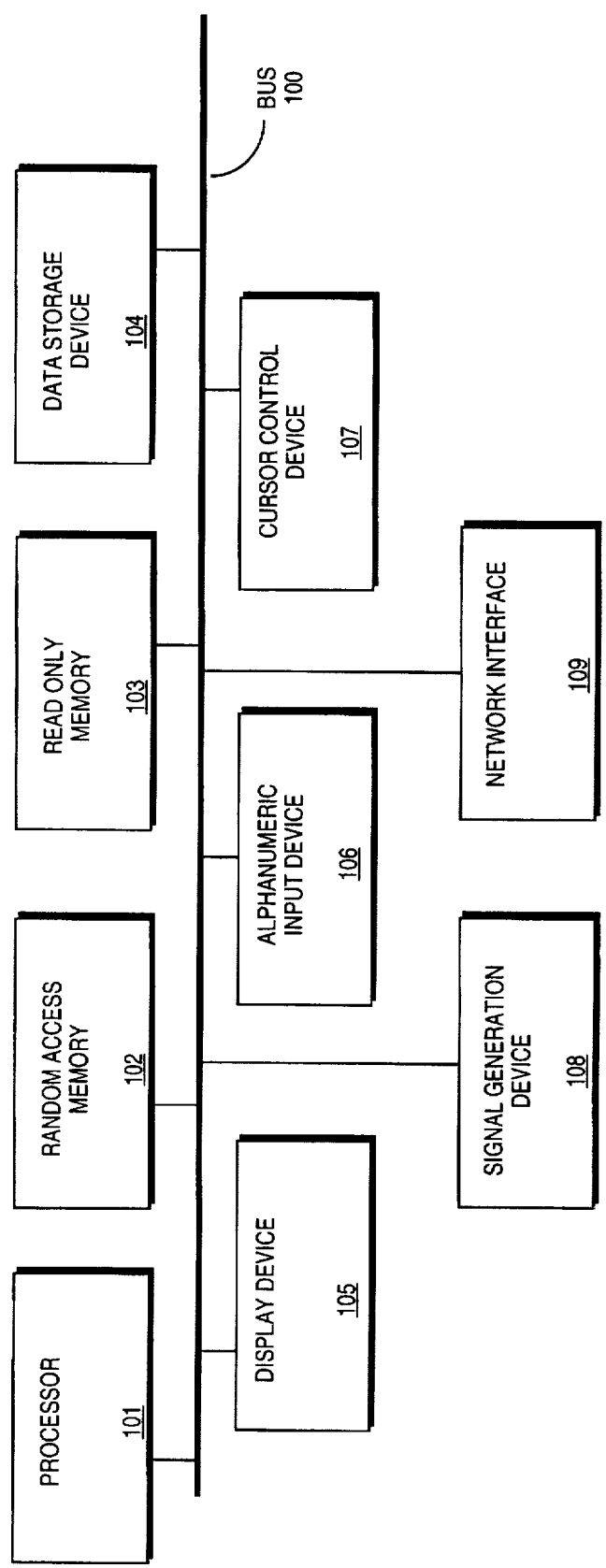
FIG. 1 is an illustration of the computer system architecture of a host computer of the present invention.

A preferred embodiment of the present invention is implemented on a computer system as depicted in FIG. 1. In general, such systems comprise a bus 100 for communicating information, a processor 101 coupled with said bus 100 for processing information, a random access memory (RAM) 102 coupled with said bus 100 for storing information and instructions for said processor 101, a read-only memory (ROM) 103 coupled with said bus 100 for storing static information and instructions for said processor 101, a data storage device 104, such as a magnetic disk and disk drive, coupled with said bus 100 for storing information and instructions, a display device 105 including a display screen coupled to said bus 100 for displaying information to the computer user, optionally an alphanumeric input device 106 including alphanumeric and function keys coupled to said bus 100 for communicating information and command selections to said processor 101, a cursor control device 107 coupled to said bus 100 for communicating information and command selections to said processor 101, a signal generation device 108 coupled to said bus 100 for communicating command selections to said processor 101, and a network interface 109 for coupling said computer system to a network for transmitting and receiving information packets to/from other host computers or other computer networks.

The display device 105 may include a liquid crystal device, cathode ray tube, or other suitable display means. The cursor control device 107 allows the computer user to dynamically signal the two-dimensional movement of a visible symbol on a display screen of said display device 105. Many implementations of the cursor control device are known in the art including trackball, mouse, joy stick, or special keys on the alphanumeric input device 106 capable of signally movement in a given direction. The network interface 109 is also a standard component well known in the computer art. Many different network protocols may equivalently be supported by the network interface 109 of the present invention. For example, the network interface 109 may be compatible with ethernet, XTP, TCP, decnet, or other common network protocols.

The features and design of the present invention are described below. The general operation of the display device, cursor control device, or network interface is described only where necessary to provide a thorough understanding of the present invention, since these methods are known to those of ordinary skill in the art.

Figure 2A:
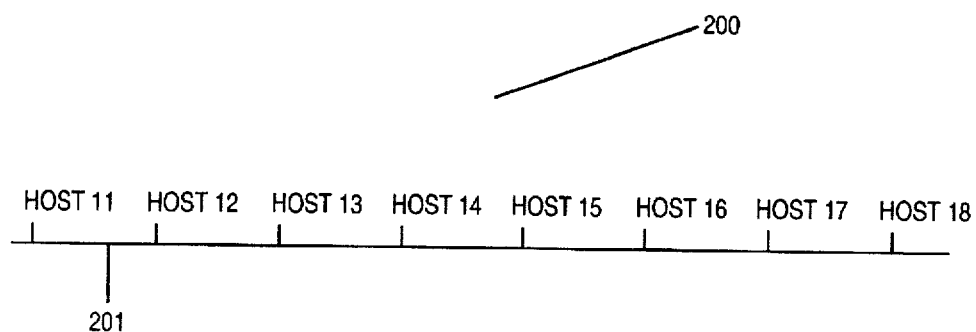
FIG. 2a is a prior art depiction of a display of a typical computer network.

Referring to FIG. 2a, a typical computer network is depicted. This network 200 comprises a plurality of host computers (HOSTS 11–18) connected with an information transfer path 201. Information transfer path 201 may be implemented as an electrical cable, a fiber-optic cable, a microwave link, or other means for transferring information between two computing devices. These modes of data transfer between computers are well known techniques in the computer art.

In a typical computer network, the host computers connected to the network may be physically located in any arbitrary configuration. However, as depicted in FIG. 2a, the logical topology of a computer network may be shown as a linear arrangement of host computers all connected with a line 201 depicting the information transfer path used to transfer information between hosts on the network.

As described earlier, each of the hosts depicted in FIG. 2a comprise a computer system similar to the one depicted in FIG. 1. It will be apparent to those skilled in the art that each of the hosts depicted in FIG. 2a may be configured differently from the system shown in FIG. 1. Some basic system components, however, such as processor 101, random access memory 102, and network interface 109 will most likely be common to all hosts connected to the network 200 depicted in FIG. 2a.

Another system component common to all hosts shown in FIG. 2a is operating system software and network system software residing in random access memory 102, read-only memory 103, and/or data storage device 104 of each host. Operating system software is executed by processor 101 and provides the logic necessary for computer system resource and task management. Network system software is also executed by processor 101 and provides the logic necessary for communicating via network interface 109 with other hosts on network 200. Operating system software and network system software are components well known to those skilled in the computer art.

Information is transferred between host computers on the network using information packets. An information packet is a group of computer words or bytes comprising control and data information. The control information for each packet typically contains a source and destination host address associated with the information packet. In this manner, the information packet can be properly routed to the appropriate destination host. The data portion of the information packet contains the information to be transferred from one host computer to another. The network system software executing in each host computer is responsible for managing the receipt and transmission of information packets over network 200. This scheme of information transfer over a typical network is a well known technique known in the computer art.

Figure 2B:
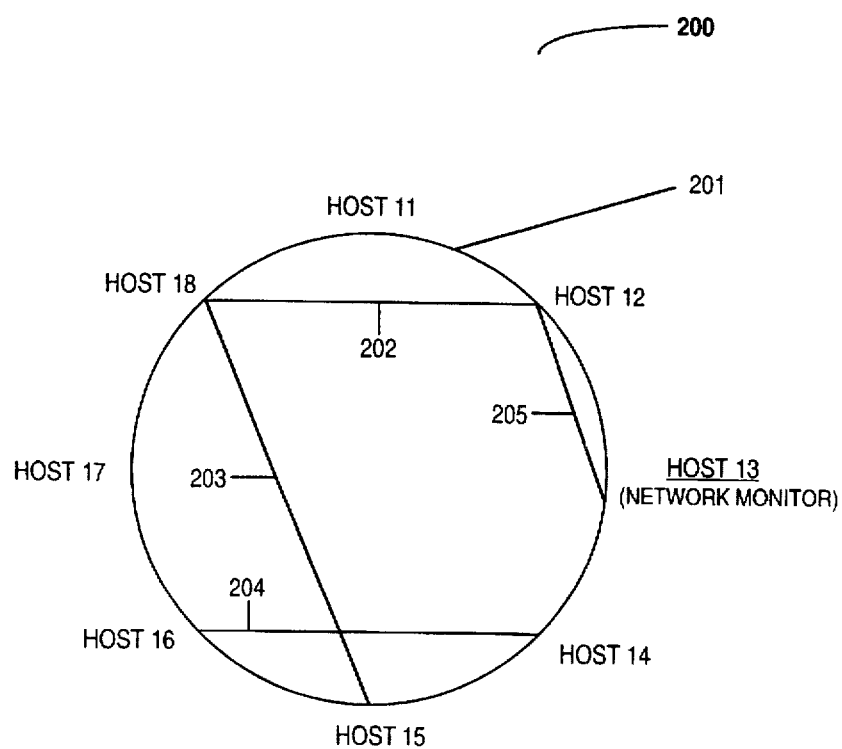
FIG. 2b is a depiction of the display of a substantially circular arrangement of hosts using the present invention.

The present invention provides a means for visually representing the topology and information transfer activity occurring on a typical network. In this way, the performance of a network can be effectively monitored and problems quickly identified and resolved. Referring to FIG. 2b, network 200 is logically shown as a substantially circular arrangement of host computers connected by a circle 201 representing the information transfer path. In FIG. 2b, each host computer is associated with a unique position on the substantially circular shape 201. The substantially circular arrangement of network hosts shown in FIG. 2b is a better arrangement for displaying network topology and network information transfer activity than the linear arrangement of FIG. 2a or other non-circular arrangements. This scheme of the present invention is better because a substantially circular arrangement assures no logical connection between two hosts will be co-linear, thus not visible.

Referring again to FIG. 2b, currently active information transfer activity is shown by line segments 202–205. Thus, in the sample network of FIG. 2b, information packets are actively being transferred between HOST 18 and HOST 12 (line 202), HOST 18 and HOST 15 (line 203), HOST 16 and HOST 14 (line 204), and HOST 12 and HOST 13 (line 205). This same information transfer activity cannot be shown using the arrangement in FIG. 2a, since the paths between hosts are co-linear, thus not distinctly visible. This is also the case for other arrangements of hosts that are not substantially circular.

Figure 2C:
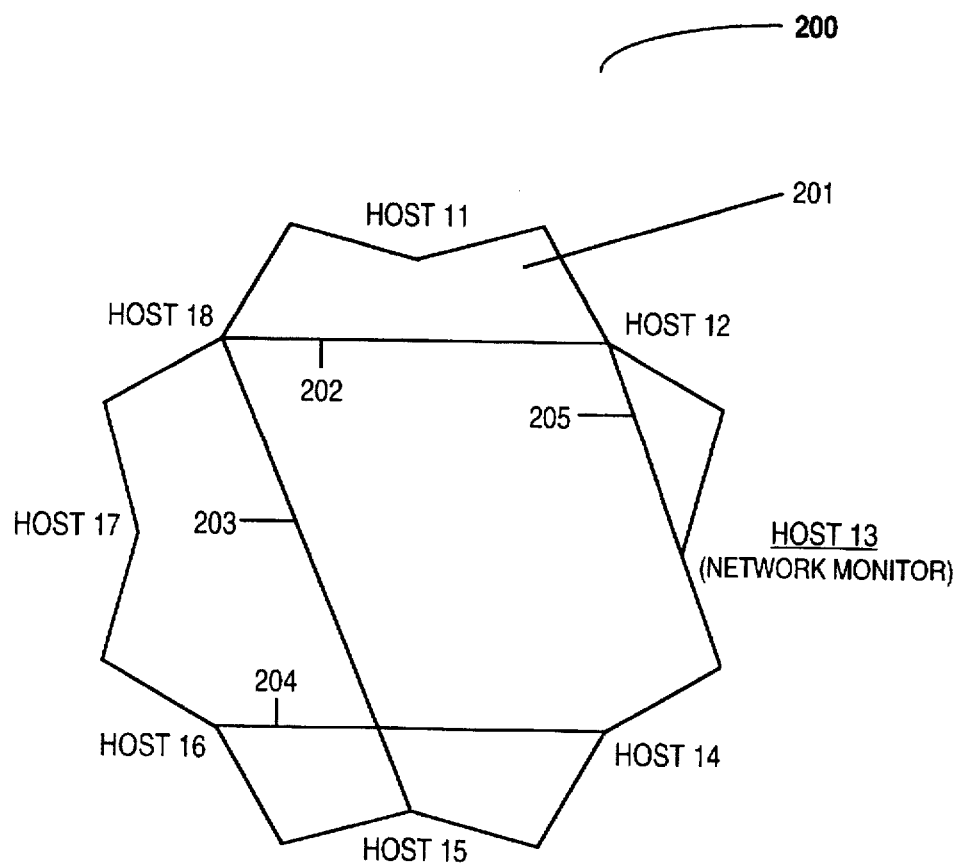
FIG. 2c is an alternative embodiment of the depiction of the display of a substantially circular arrangement of hosts in a multi-sided polygon shape.

In an alternative embodiment, the substantially circular arrangement of network hosts may be implemented as a multi-sided substantially circular polygon as shown in FIG. 2c. In this alternative embodiment, the total quantity of network hosts existing in the network is factored into the logical arrangement of host representations presented on the display screen. Specifically, a polygon is generated with a number of sides twice the number of network hosts. The representations of network hosts are then evenly distributed around the polygon. This even distribution may be accomplished by associating alternate corners of the polygon with a network host as shown in FIG. 2c. Equivalently, a polygon with a multiple of twice the number of network hosts may be generated. Note that the polygon shape approaches a circle as the number of sides increases. In another alternative embodiment, an elliptical or oblong arrangement may be used to represent the network. Other equivalent shapes may be employed showing unique line segments between communicating nodes.

Figure 3A:
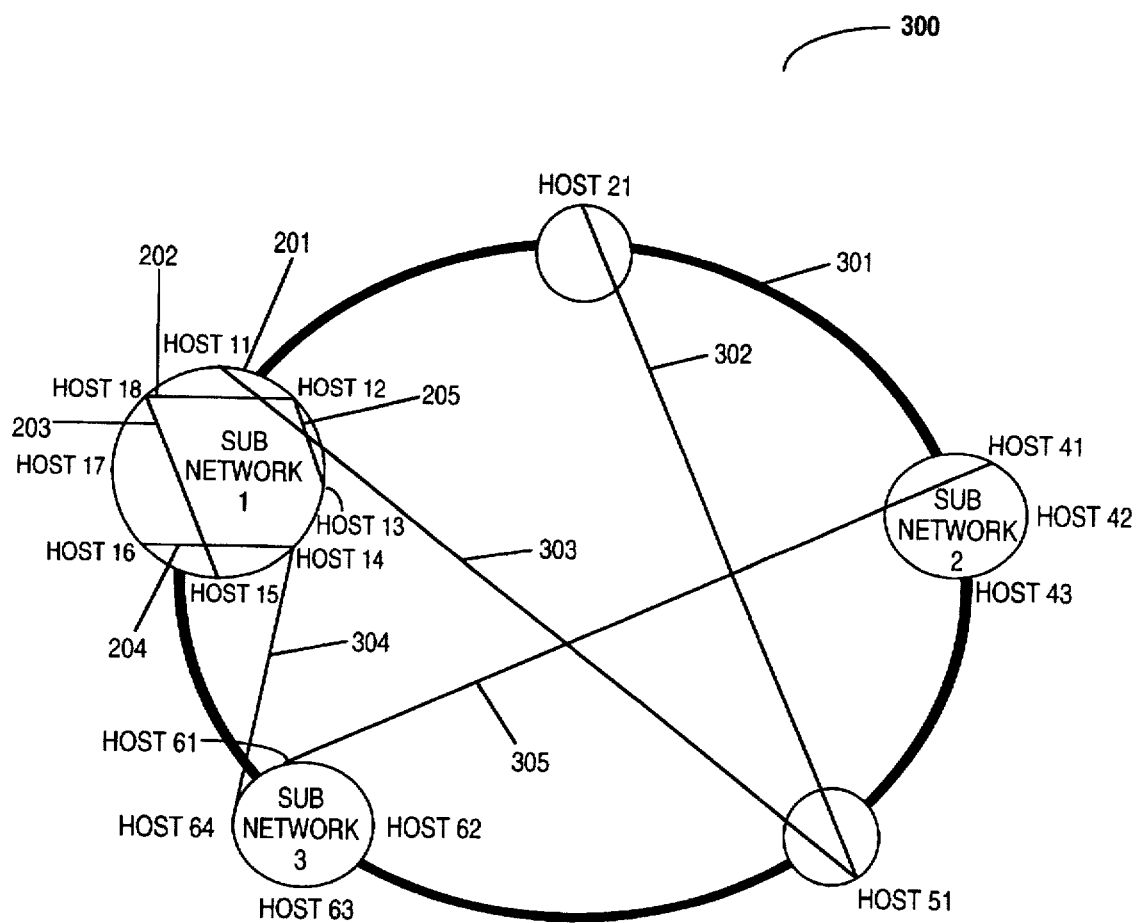
FIG. 3a is a depiction of the display of a substantially circular arrangement of hosts and sub-networks of hosts.
Figure 3B:
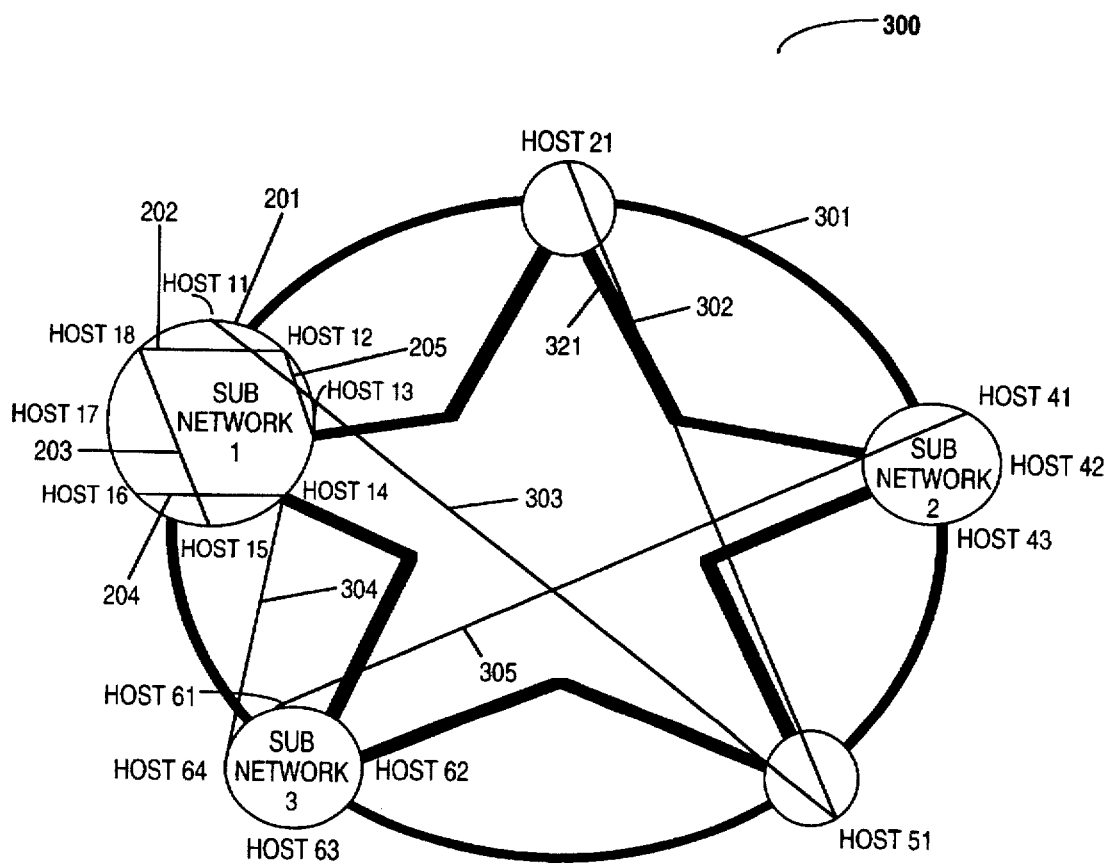
FIG. 3b is an alternative embodiment of the depiction of the display of a substantially circular arrangement of hosts and sub-networks of hosts in a multi-sided polygon shape.
Figure 3C:
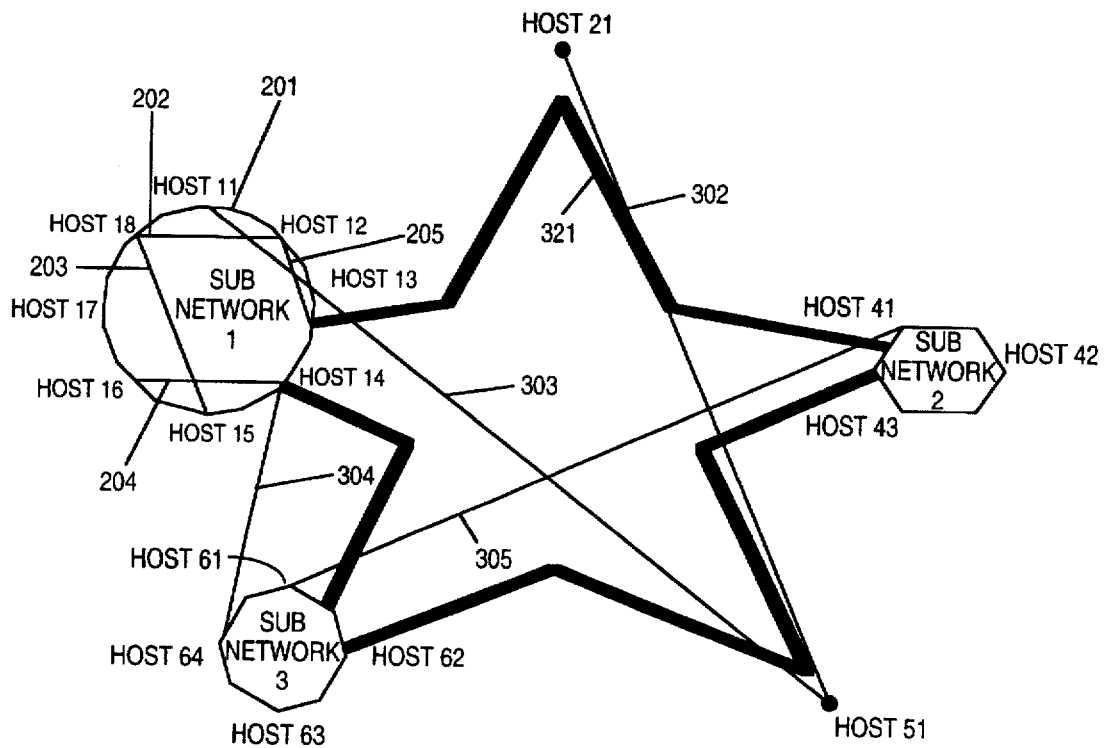
FIG. 3c is an alternative embodiment of the depiction of the display of a substantially circular arrangement of hosts and sub-networks of hosts in a multi-sided polygon shape where each sub-network is itself depicted as a multi-sided polygon shape.

Referring to FIGS. 3a–c, the substantially circular arrangement of host computers displayed by the present invention can be extended to a network 300 wherein both individual host computers and sub-networks or local area networks (LANs) are logically arranged in a substantially circular representation as shown in FIGS. 3a–c. In the preferred embodiment of the present invention, individual host computers and sub-networks are arranged on a circle 301. Circle 301 is not actually displayed with the other images on the display screen. The circle 301 is shown in FIGS. 3a–b merely to highlight the circular arrangement of the host computers and sub-networks. In an alternative embodiment of the present invention, individual host computers and sub-networks are arranged in a substantially circular representation using a multi-sided polygon 321. Again, multi-sided polygon 321 is not actually displayed with the other images on the display screen. The multi-sided polygon 321 is shown in FIGS. 3b–c merely to highlight the circular arrangement of the host computers and sub-networks.

In the network 300 of FIGS. 3a–c, three sub-networks (Sub-networks 1–3) and two individual host computers (HOST 21 and HOST 51) exist on network 300. Each sub-network is itself displayed as a circular arrangement of host computers. Sub-networks may themselves also contain lower-level networks in addition to individual host computers. A unique position on each of the sub-network substantially circular shapes is associated with each host computer member of that sub-network.

As in the network of FIG. 2b, the information transfer activity in the complex network topology of FIGS. 3a–c may be shown using line segments connecting source and destination hosts. By virtue of the substantially circular arrangement of hosts and sub-networks, each information transfer path between any two hosts may be uniquely represented.

As described above, an alternative embodiment employing a multi-sided polygon arrangement of representations of host computers may be extended to a network containing both host computers and sub-networks. This alternative embodiment is illustrated in FIGS. 3b–c. In this case, the total quantity of independent hosts is added to the number of sub-networks to produce a number of positions necessary in the arrangement. This number is then doubled (or multiplied by some larger integer than 2) to produce the number of sides for the polygon shape. The representations of host computers and sub-networks are then evenly distributed around the polygon shape as described above. A unique position on the polygon shape is associated with each host computer or sub-network. In the examples shown in FIGS. 3b–c, multi-sided polygon 321 is a 10 sided shape; since, there are two individual hosts plus three sub-networks. Thus: (2 hosts+3 sub-networks)*2=10 sides. In the example of FIG. 3c, each of the sub-networks 1–3 are themselves displayed as a substantially circular arrangement of hosts using the same method of arranging with a multi-sided polygon shape with a number of sides corresponding to the number of hosts. Thus, sub-network 1 uses a 16-sided polygon because of the 8 member hosts, sub-network 2 is represented by a six sided polygon because of the 3 member hosts, and sub-network 3 uses an eight sided shape because of the 4 member hosts. Note that the number of sides for the polygon can equivalently be an integer multiple greater than two times the sum of the number of hosts and sub-networks. The individual hosts (i.e. Host 21 and Host 51) can be represented by a point or dot, which also can be considered a substantially circular shape. A unique position on each of the sub-network polygon shapes is associated with each host computer member of that sub-network.

The present invention is embodied in the form of computer program logic residing in one or more of the host computers connected to network 200 or network 300. This program logic can be denoted network monitor software. For the purposes of illustration. HOST 13 in FIG. 2b is identified as a network monitor. The network monitor contains the network monitor software of the present invention executed by processor 101 and stored in random access memory 102, read-only memory 103, and/or data storage device 104. It will be apparent to those skilled in the art that other hosts on network 200 or network 300 may concurrently be executing the network monitor software of the present invention.

The processing logic of the present invention uses the network system software described above to receive each information packet sent across the network between any one host computer. As each information packet is received by the network monitor, the control portion of the information packet is decoded. Thus, the source and destination address for each packet may be extracted.

In addition, other control information such as the type of data transfer, the transfer protocol (e.g. TCP, ethernet, XTP, decnet, etc.) associated with the information packet, and other pertinent control information may be collected. The network monitor collects information on network activity by decoding information packets as they pass across the network.

By scanning information packets passing across the network, the network monitor of the present invention is able to build a data base containing information related to the topology and information transfer activity occurring on the network. Using this network data base, the network monitor is also able to generate a graphical representation of network topology and activity. Referring again to FIG. 2b and FIGS. 3a–c, network topology and information transfer activity may be shown graphically by generating a plurality of first geometric shapes each substantially resembling a circular shape, each of said first geometric shapes representing at least one of said host computers, each of said host computers being associated with a position in one of said first geometric shapes;

arranging said plurality of first geometric shapes in a substantially circular arrangement, said arrangement corresponding to said network topology; and displaying said arrangement on said display device;

receiving at least one information packet sent on the network by one of the host computers;

decoding information contained in the information packet; and displaying a line segment on the display device connecting two positions associated with the host computers, the location of the line segment corresponding to the information obtained in the decoding step.

In addition, network activity may be shown with color-coded, dashed or shaded line segments connecting two host computers between which information packets are actively being transferred. Network activity may be equivalently coded as a particular line width of a line segment associated with information flow between two hosts. The color-coding, or equivalent distinctive visual indication, may represent the quality, quantity, or type of information being transferred between hosts. Such network activity line segments are depicted in FIG. 2b and FIGS. 3a–c as line segments 202–205 and 302–305.

The present invention also provides a means for displaying traffic between sub-networks of a network either in terms of traffic between endpoints (host computers originating an information packet or being the final destination for an information packet) or traffic between gateways. A gateway is a particular host on a sub-network providing an interface between the sub-network and other sub-networks or other hosts. The gateway is typically not the originator or final destination for an information packet, but merely a means for routing packets from one sub-network to another.

In addition, the present invention employs security means for verifying the identity of a user activating the network monitor process of the preferred embodiment. Prior to displaying network topology or activity information to a user, the identity of the user is checked against an access code maintained for the network. Access codes may equivalently be maintained for each host computer and sub-network.

Operation of the Preferred Embodiment

Figure 4:
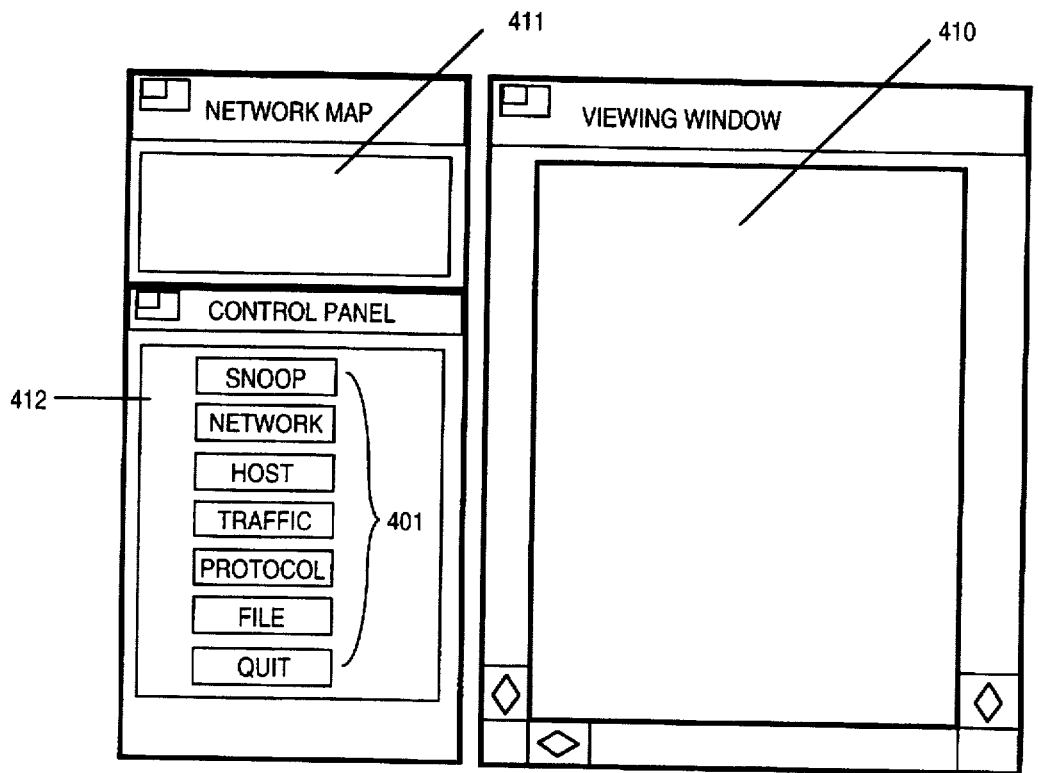
FIGS. 4 and 5 are illustrations of the operation of the preferred embodiment within windows on a display screen.

As described above, the processing logic associated with the present invention is executed on one or more host computers connected to a network. Host computers running the processing logic of the present invention are denoted as network monitors. When the processing logic of the present invention is first initiated by a network monitor, a visual display similar to that shown in FIG. 4 is presented on display device 105 associated with the network monitor. The display thus presented consists of three windows typically covering the entire display device 105. Each window has a discrete function. Each window can be stowed, moved, and manipulated using a stow box, a title bar menu, and a close box. These techniques for manipulating windows are well known in the art.

Referring to FIG. 4, the present invention displays a plurality of soft keys 401 used for operator communication with the program logic. These soft keys are activated by manipulating the cursor control device to place a cursor symbol inside the box associated with a particular soft key. Upon activation of signal generation device 108, the processing logic of the present invention is notified of a particular command selection. Again, the use of soft keys in the manner of the present invention is a technique well known in the computer art. It will be apparent to those skilled in the art that other means for command selection are available. For example, an alphanumeric keyboard may be used for command entry in place of soft keys.

The preferred embodiment of the present invention provides a means for displaying within windows on a computer display device a graphical representation of the network topology and information transfer activity occurring on a network of interest. Such a display is depicted in viewing window 410 of FIG. 5. Window 411 is used to display a network map associated with the display in the viewing window 410. Window 412 is a control panel window used for the display of a plurality of soft keys 401 available for user interaction with the network monitor software of the present invention.

Figure 5:
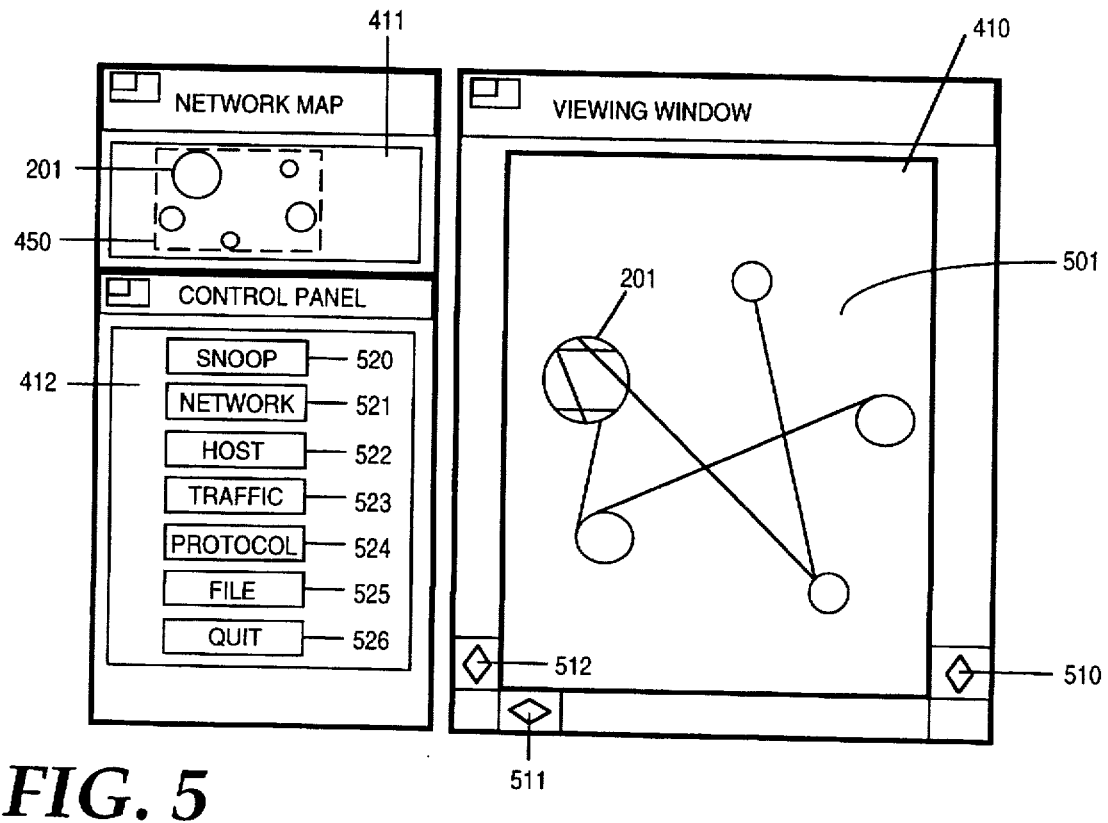

Referring to FIG. 5, a graphical representation of a typical network topology and information transfer activity 501 is shown within viewing window 410. The portion of the image 501 visible in viewing window 410 can be changed with regard to position as well as scale by using either the cursor control device 107 or scroll bars 510, 511 and 512 associated with viewing window 410. The right scroll bar 510 is used to enlarge the area displayed within viewing window 410. By moving the scroll bar 510 in a downward direction, the user can "zoom" in on a particular host, sub-network, or other selected area. The bottom scroll bar 511 and the left scroll bar 512 provide a means for moving the image relative to viewing window 410. The bottom scroll bar 511 moves the view of the image horizontally left or right, relative to viewing window 410 as the image follows the direction in which the scroll bar 511 is dragged by cursor control device 107. The left scroll bar 512 moves the view of the image vertically up and down, relative to viewing window 410 as scroll bar 512 is moved up and down. The view of the network image 501 visible within viewing window 410 can also be changed by dragging cursor control device 107 within viewing window 410. This is accomplished by depressing signal generation device 108 while cursor control device 107 is moved within viewing window 410. As this occurs, the view of the network image 501 within viewing window 410 is moved in two dimensions in corresponding fashion with the two dimensional movement of cursor control device 107. When the appropriate view of the network image 501 is obtained, the user releases signal generation device 108 and the two dimensional movement of the view 501 within viewing window 410 terminates.

The image displayed within network map window 411 represents a reduced scale version of the network map image visible within viewing window 410. Since viewing window 410 may be zoomed in or moved in such a way that the entire network image 501 is not visible within the window 410, the network map window 411 provides a means for displaying an overview of the entire network image which is always visible within network map 411. This overview of the network displayed within network map 411 can be used to indicate the portion of the network currently in view in viewing window 410. Network map 411 may also be used to change the portion of the network currently in view within viewing window 410.

The network image displayed within network map window 411 is enclosed in a yellow rectangle 450 at program start up. This yellow rectangle 450 shows the area currently displayed in the viewing window 410. By manipulating the yellow rectangle 450 in network map window 411, the view in viewing window 410 can be modified; the area of the network in the yellow rectangle 450 continues to be associated with the area of the network displayed in the viewing window 410. In this way, network map 411 can be used instead of viewing window 410 to change the image that is displayed within viewing window 410. Regardless of the position of the yellow rectangle 450 displayed within network map 411, the network map 411 always shows the entire known network.

In order to change the position of the yellow rectangle 450 located in network map 411 and thus, change the image displayed in viewing window 410, the cursor control device 107 is used in conjunction with signal generation device 108 to drag the yellow rectangle 450 to the desired position within network map 411. In corresponding fashion, the image within viewing window 410 moves in a manner associated with the position of the yellow rectangle 450 located in network map 411. Thus, a means for changing the display of the image within viewing window 410 is provided using means within network map 411.

The information displayed within viewing window 410 and network map 411 is dictated by a user who is able to manipulate a menu of soft keys provided in a control panel window 412 as shown in FIG. 5. In the preferred embodiment, the control panel window 412 is located in the lower left hand portion of the display screen. To use the menu items provided by control panel 412, cursor control device 107 is used to move a cursor symbol to a position within a box associated with the desired menu option or soft key followed by an activation of signal generation device 108. These actions simulate push buttons as a means of tuning or configuring the operation of the present invention. Most functions activated using the means provided within control panel 412 control a discrete aspect of the network monitor software, while other functions allow access to other menus, options, or the ability to save data to a file on the computer system. In general, the functions provided by control panel 412 control the items monitored and displayed by the network monitor software of the present invention.

Referring to FIG. 5, the "snoop" function 520 is used to start or stop the scanning of network traffic by a host. Network traffic is the information transfer activity occurring on the network. The name of a particular scanning host can be specified when the "snoop" function is chosen. Equivalently, a separate snoop process may be initiated that gathers data for the network monitor and communicates with it at periodic intervals or when polled by the network monitor. More than one snoop process may be concurrently executed. For example, a separate snoop process may be running in each of several sub-networks. Each process reports back to the network monitor.

The "network" function 521 provides a means for configuring the way in which networks are displayed within viewing window 410. By activating the "network" function 521, four other options are provided for selection by a user. First, the user may display all networks or only those networks that are active. Active networks are those actively involved in the transfer of information between hosts on the network. If the "display all" option is selected, all networks are displayed in light blue within viewing window 410. If the "display active only" option is selected, only active networks are displayed in light blue within viewing window 410. Inactive networks are displayed in dark blue. Alternatively, active networks may be displayed in black or white, while inactive networks are displayed in a pale gray. This alternative implementation may be used for display devices without a color capability.

The second set of options provided by "network" function 521 is an "add new network" or "ignore new network" option. If the network monitor receives an information packet from an unknown network, the processing logic will either add the network to the network map, or ignore it based upon the option selected. Using the "add new network" option allows a user to analyze information traffic from all available networks. Using the "ignore new networks" option allows the network manager to concentrate on networks already selected for viewing.

The third option provided within the "network" function 521 is the "label networks by name" or "label networks by network number" option. The circles representing networks displayed in viewing window 410 can be labeled by either the network name or the network address as specified by this option.

The fourth option provided by the "network" function 521 is the option to delete a network from the map. The network monitor software allows the user to display only those networks of interest. Using the "delete network option", the user can remove a network from the display in viewing window 410.

The "host" function 522 provides a means for configuring the way in which hosts are monitored and displayed. Similar to "network" function 521, "host" function 522 provides four options for configuring hosts. First, an "add new host" or "ignore new host" option is provided. If the network monitor receives an information packet from an unknown host, the network monitor software will either add the new host to the network view or ignore it, based upon the option selection. If the "add new host" option is selected, the network monitor software can be configured to display host names in any of four different name and address schemes.

The second option provided by the "host" function 522 is the "find host" option. When the network displayed in viewing window 410 is large and complex, the ability to find a particular host is very useful. The "find" option provides a means for specifying a particular host by name or address so that the network monitor software may search for that particular host. If the specified host is found, the view in viewing window 410 is adjusted to display the desired host in red within viewing window 410.

A third option provided by the host function 522 is the "display route option". Using the "display route option", a means for tracing the path taken by information packets leading to or from a particular host is provided. By tracing the route taken by information packets, a network manager may be able to diagnose a bottleneck occurring at a particular point in a network. In addition, other route display categories are provided. For example, particular types of routes (TCP-IP or ethernet) may be specifically displayed. Route names may also be displayed.

The fourth option provided by the host function 522 is the "delete host" option. Using this option, a user can remove from the network display 410 hosts not of interest.

The "traffic" function 523 provides a means for configuring the characteristics of the display of network traffic (information transfer activity) in the viewing window 410. As described earlier, the transfer of information packets between two hosts on the network is displayed in viewing window 410 using a line segment connecting the sending and receiving host. The amount of traffic (quantity of information) being transferred between hosts is represented in viewing window 410 by color coded line segments drawn between communicating hosts. Alternatively, line segments may be coded in shades of gray for display devices without a color capability. Similarly, dashed or dotted line segments or various line thicknesses may equivalently be used. The color or shade of the line segments is re-scaled every five seconds by default, based on the volume of information transfer activity (traffic) occurring during the previous five second interval. This re-scale interval can be configured using an option in the "traffic" function 523.

The volume of traffic occurring between hosts on the network is measured in terms of the number of information packets or the number of bytes as configured using an option in "traffic" function 523. The lowest volume of traffic is depicted as a purple or pale gray line while the highest level of traffic is light green, white or black. The colors or shades displayed are used to convey subtle changes in the volume of traffic occurring between hosts.

"Traffic" function 523 provides four options for configuring the display of network traffic. The first option is the "traffic re-scaling" option. Re-scaling denotes the calculation and representation of the amount of traffic between hosts in the network. This representation of traffic can either be turned off or the interval between re-scaling operations can be changed.

The second option in the "traffic" function 523 is the "traffic time-out option". While information packets are being transferred between hosts, a color-coded, dashed or shaded line segment is displayed in viewing window 410 between the communicating hosts. Once the transfer of information packets ceases, the coded line segment connecting the hosts is removed after a time-out period. The "traffic time-out" option provides a means for configuring the length of time after which the traffic connection or coded line segment fades from view.

The third option in "traffic" function 523 is the "scale traffic option". Using this option, the scale with which traffic quantity is calculated can be configured to be either the number of information packets transferred or the number of bytes transferred between hosts.

The fourth option provided by traffic function 523 is a means for displaying traffic between networks either in terms of traffic between endpoints or traffic between gateways. Using the "endpoint" or "gateway" option, the coded line segment connecting communicating hosts can be either configured to connect the endpoints (the destination and source host computer) or the gateway being used by a host computer within a sub-network.

Information packets transferred on a typical network may be one of several different types corresponding to the protocol used for the information transfer (e.g. TCP, ethernet, XTP, decnet, etc.). Using the "protocol" function 524, traffic associated only with the protocols selected will be displayed in viewing window 410. In this way, the monitoring of particular types of network protocols can be targeted. When a protocol is selected using the protocol function 524, all information packets classified as pertaining to that selected protocol are displayed as color-coded, dashed or shaded line segments in viewing window 410.

The "file" function 525 provides a means for saving network information in a data file or data storage device 104. The file function 525 provides a means for either opening a data file, saving the current network data to a data file or image file, or clearing all current data. By default, network data is saved to the data file.

Processing Logic of the Preferred Embodiment

The present invention includes computer program logic for the operation of the network monitor and display system. This program logic is described in the following section and shown in FIGS. 6–11. In addition to the computer resources described earlier, the present invention relies upon the availability of an operating system and system functions capable of displaying windows, graphical and textual information within windows, alphanumeric characters, vectors, conics, and a cursor symbol on the display device. Some low level system functions supporting the network interface of the present invention may also be required. These resources are standard computer processing components known in the computer art.

The processing logic of the present invention resides in one or more of the host computers connected to network 200. This processing logic is executed by processor 101 associated with the host computer in which the processing logic of the present invention is resident.

The processing logic of the present invention (network monitor software) performs two basic functions. First, the network monitor software receives and decodes information packets being transferred on a network. This function is denoted "the network scanner". Secondly, the network monitor software includes a display generator function. This component is denoted "the network display generator". In the preferred embodiment, the network scanner component and the network display generator component are two separate software components capable of being executed independently and concurrently by the same or a different host computer. In this manner, a visual display of network topology and activity can be presented on one host computer based on information packets captured and decoded by a network scanner running on a different host computer. In an alternative and equivalent embodiment, the network scanning component and the network display generator component can be combined into a single software component executing on a single host computer.

Figure 6:
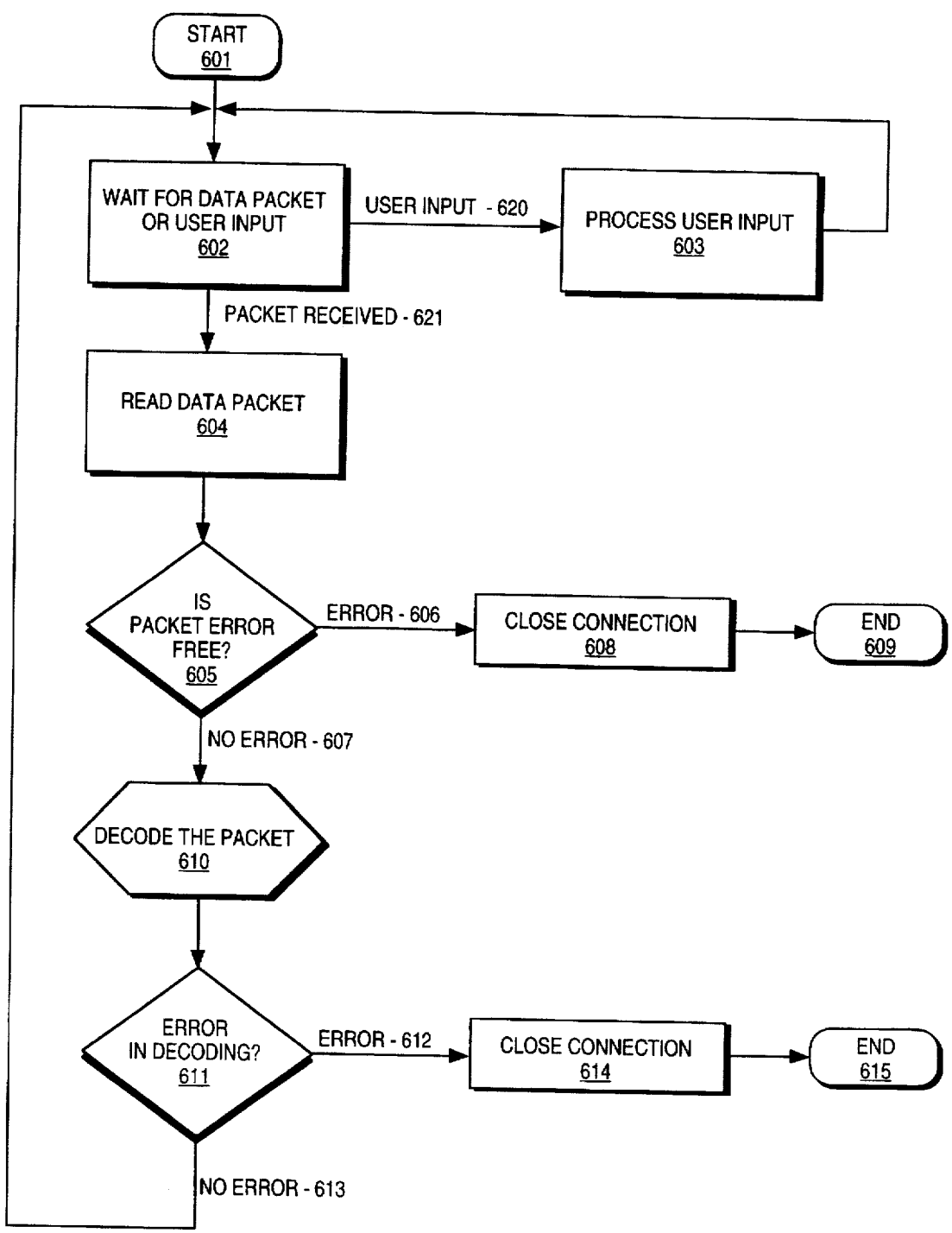
FIGS. 6–11 are flowcharts of the processing logic of the present invention.

FIGS. 6–11 illustrate the processing logic for both the network scanning component and the network display generation component. Referring to FIG. 6, processing box 601 labeled "start" denotes the initial starting point of the processing logic for the network monitor software of the present invention. When the network monitor software is first activated, processing begins at processing box 601. Initially, the network display generation component generates viewing window 410, network map 411, and control panel 412 on the display device 105. Next, the network monitor software waits for an information data packet being sent on the network or user input from one of the softkeys 401 in control panel 412. If the user chooses to configure the operation of the network monitor program using one of the softkeys 401, processing flow continues at processing box 603 where the user input is processed, as described earlier. The processing flow then loops back to processing box 602 and continues, as long as the user continues to provide configuration input.

If an information packet is detected by the network interface, processing flow continues at processing box 604 where the information data packet is received and decoded. The information data packet is first scanned for errors, such as parity errors occurring during transmission. If an error is detected (decision path 606), the connection between the sending host computer and the receiving host computer is closed (processing box 608) and processing of network monitor software terminates at termination box 609.

If no error is detected in the information packet (decision path 607), a procedure is activated for decoding the information in the information packet (procedure box 610). If an error is detected in decoding the information packet during procedure call 610 (decision path 612), the connection between the sending and receiving host computers is closed (processing box 614) and network monitor software is terminated at termination box 615. If no error is detected in decoding (decision path 613), then processing control loops back to the beginning of the processing flow starting at processing box 602.

Figure 7:
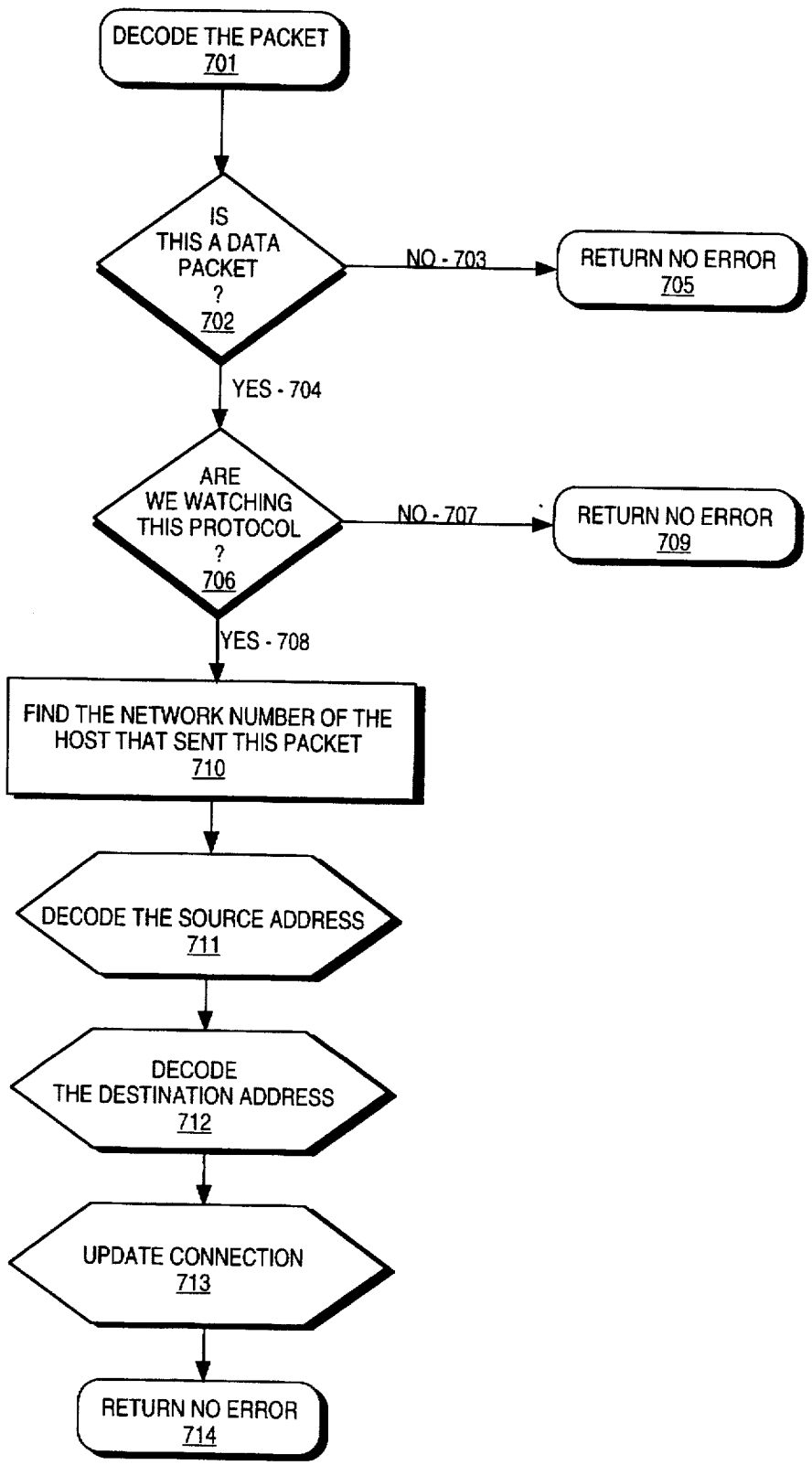

Referring to FIG. 7, the procedure for decoding an information packet is illustrated. When the procedure call for decoding an information packet 610 is activated as shown in FIG. 6, the processing logic begins at processing box 701, as shown in FIG. 7. First, the information packet is scanned to determine if the information packet is a data packet (decision box 702). If the packet is not a data packet (decision path 703), control returns from procedure 610 through termination box 705. If the packet is found to be a data packet (decision path 704), another test 706 is performed to determine if the information packet conforms to the protocol selected for monitoring during the configuration process. If the information packet does not conform to a selected protocol (decision path 707), control returns from procedure 610 through termination box 709. If the information packet does conform to a selected protocol (decision path 708), additional processing is performed to add the data packet to the network monitor display starting with processing box 710.

Beginning at processing box 710 in FIG. 7, the network number associated with the host that sent the captured information packet is retrieved. Next, two calls are made to a procedure for decoding the address of the sending and receiving host computers. First, the source address is decoded using a procedure call in procedure box 711. Next, the destination address is decoded using a procedure call in box 712. In both cases the processing logic for decoding the address is depicted in FIG. 8 and described below.

Figure 11:
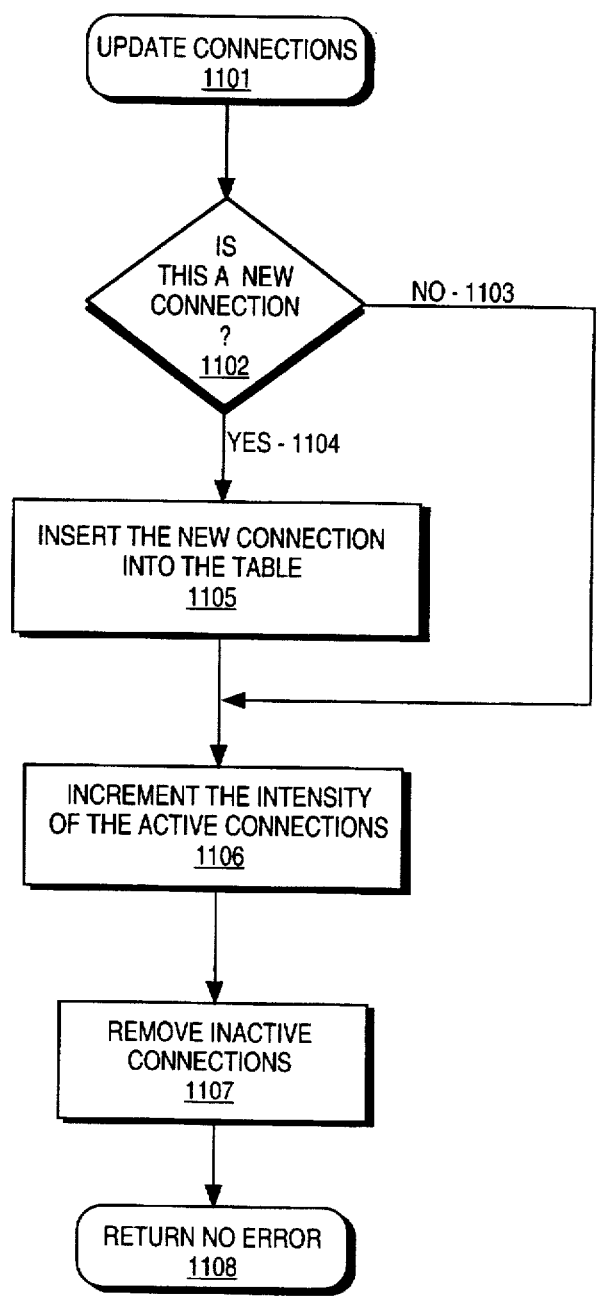

Once the processing calls 711 and 712 are completed, another processing call 713 is made to update the connection between the source and destination host computers. The processing logic associated with procedure call 713 is depicted in FIG. 11 and described below. Once the connection is updated using procedure call 713, control returns from procedure 610 through termination box 714.

Figure 8:
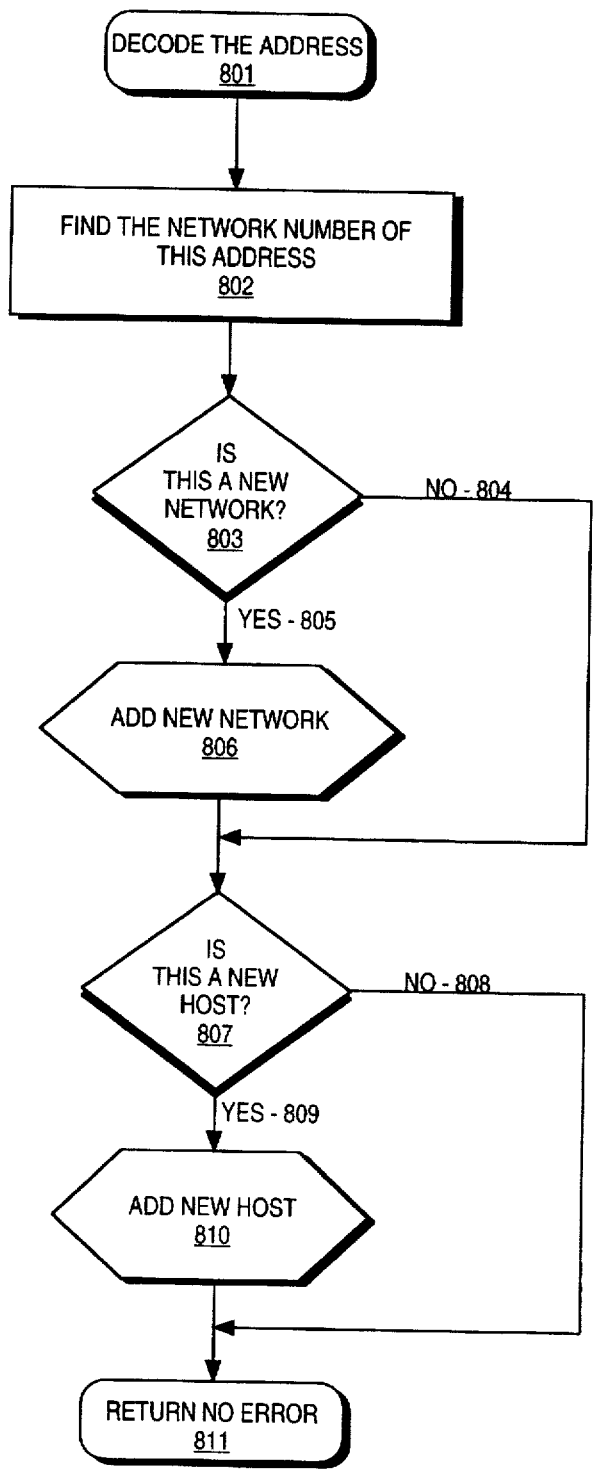
Figure 9:
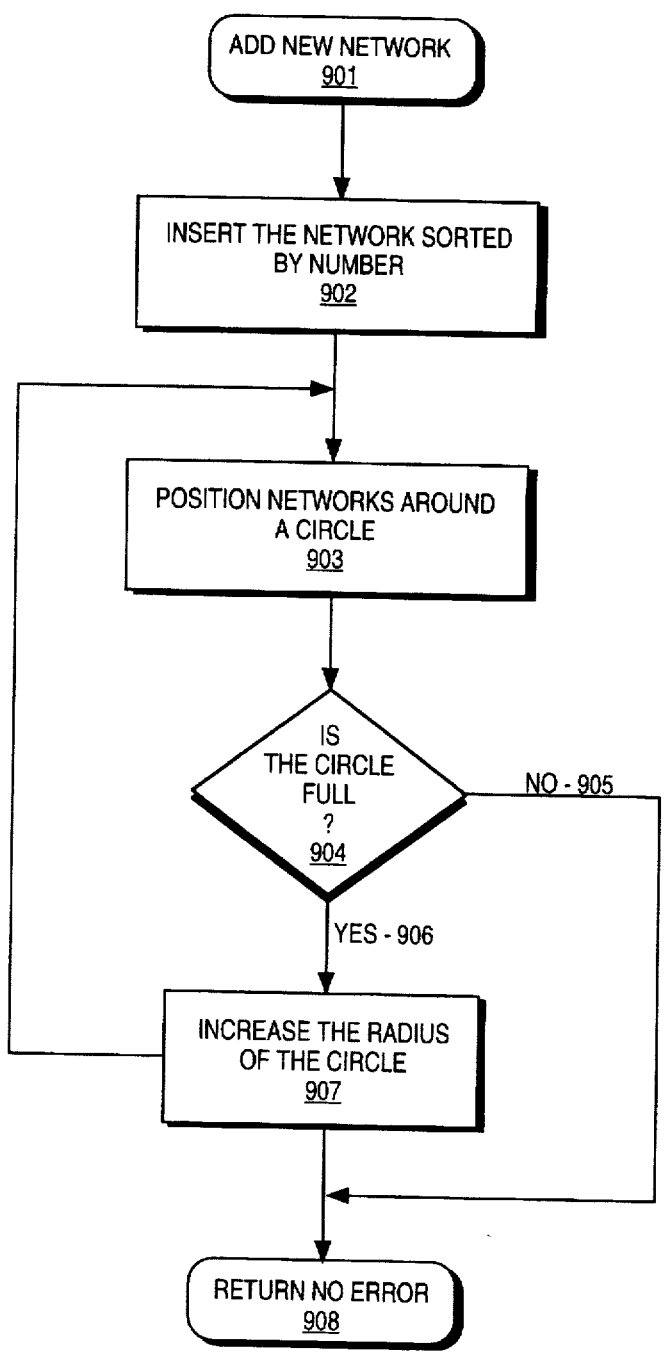

The processing logic associated with procedure calls 711 and 712 is depicted in FIG. 8 starting at processing box 801. First, the network number associated with input host address is determined in processing box 802. If this network number represents a new network not currently represented in the network display (decision path 805), a procedure call is made 806 to add the new network to the network monitor display image. The processing logic associated with procedure call 806 is depicted in FIG. 9 and described below. Upon termination of the logic associated with procedure call 806, control drops to decision box 807. Referring back to decision box 803, if the network number represents a previously known network (decision path 804), processing drops immediately to decision box 807, without executing procedure call 806.

Figure 10:
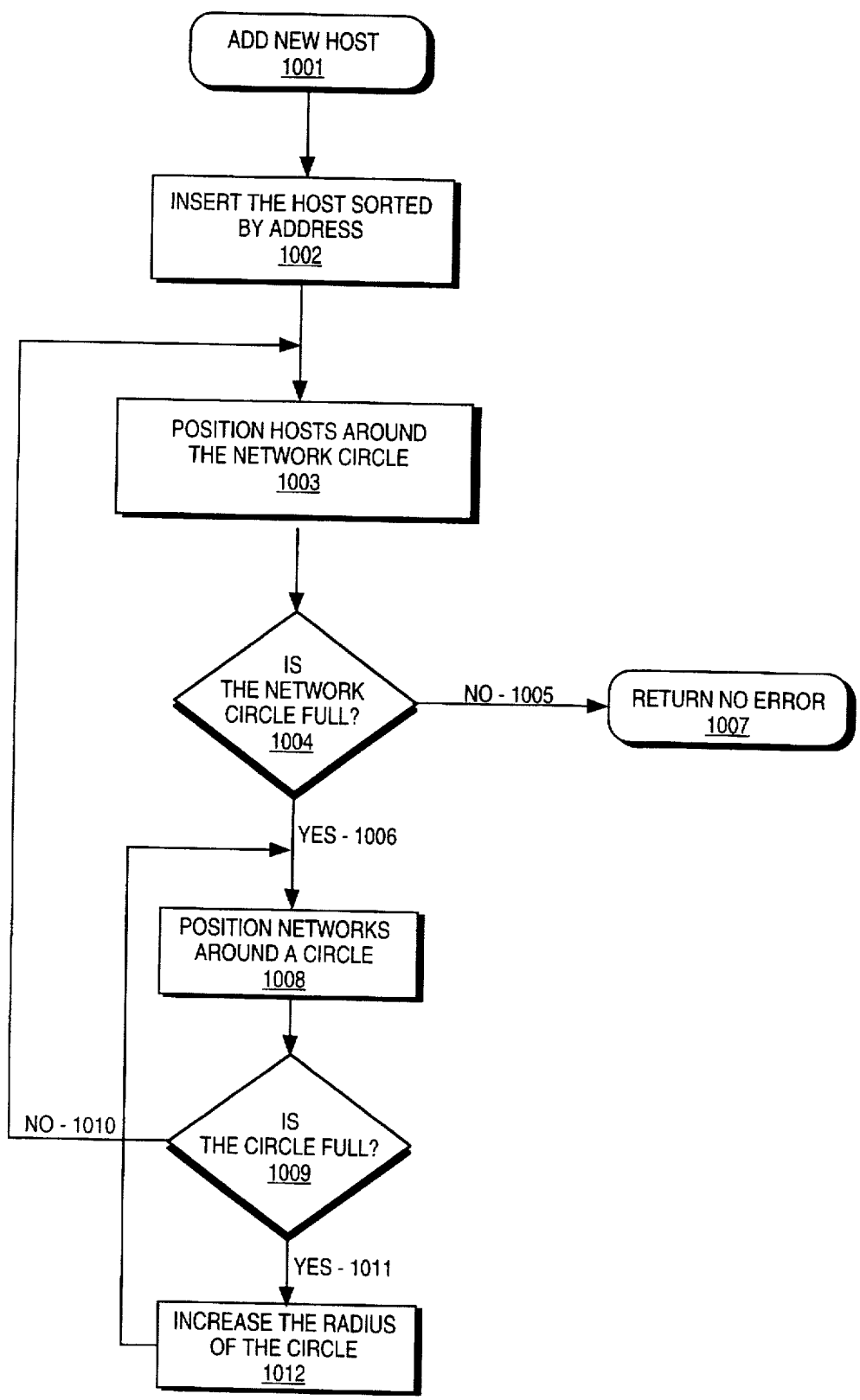

Beginning at decision box 807 in FIG. 8, the input host address is checked to determine if the address represents a new host computer not before represented in the network display. If the host does represent a new host (decision path 809), a procedure call 810 is made to add the new host to the network display. The processing logic associated with the procedure call 810 is illustrated in FIG. 10 and described below. Once the processing logic associated with procedure call 810 is completed, processing control drops to termination box 811 where control returns from the address decoding procedure. Referring back to decision box 807, if the host associated with the input host address does not represent an unknown host (decision path 808), processing drops immediately to return box 811 without executing the "add new host" procedure 810.

Referring now to FIG. 9, the processing logic associated with procedure call 806 is illustrated. Beginning at processing box 901, the new network number is inserted in a data base of network numbers maintained by the network monitor software. The new network number is inserted in such a way as to maintain a sorting of network numbers in sequential order (processing box 902). Next, the display generation process begins in processing box 903 with the positioning of networks in a substantially circular arrangement. The networks currently existing in the network data base are positioned about a circle at a given initial radius (processing box 903). If the radius of the initial circle is too small to accommodate all of the currently known networks (decision path 906), the radius of the circle is increased (processing box 907) and processing control loops back to processing box 903 where another attempt is made to position the networks around a circle of a now greater radius. This process continues until the circle represented on the display is big enough to accommodate all of the networks existing in the network data base. When this occurs (processing path 905), processing drops to termination box 908 where control returns from processing call 806.

Referring to FIG. 10, the processing logic associated with procedure call 810 is illustrated. This processing logic performs the task of adding a new host to the network data base. Processing begins at processing box 1001 where the new host is inserted in the network data base (processing box 1002). The new host in inserted in such a way as to maintain a sorting of hosts by address in the network data base. Continuing at processing box 1003, the hosts currently existing in the network data base are positioned in a substantially circular arrangement. First, the hosts known in the network data base are positioned about a circle of a given initial radius. If the radius of this circle is too small to accommodate all of the hosts associated with this network (decision path 1006), processing continues at processing box 1008 where the networks currently existing in the network data base are positioned about a circle of a given initial radius. If this circle is not full (processing path 1010), control returns to processing box 1003 where the hosts are again positioned about the circle. If the circle is too small to accommodate all of the hosts and networks (decision path 1011), the radius of the circle is increased (processing box 1012) and control returns to processing box 1008 where the networks are again positioned about the circle. This processing logic continues to loop until all hosts and networks are positioned in a substantially circular arrangement of a large enough radius to accommodate all hosts and networks known in the network data base. When this occurs (processing path 1005), control passes to termination box 1007 where the add new host procedure 810 terminates. Thus, upon completion of the add new network processing logic depicted in FIG. 9 and the add new host processing logic depicted in FIG. 10, a display of the network topology is generated.

Referring to FIG. 11, the processing logic associated with procedure call 713 is illustrated. Beginning at processing box 1101, the processing necessary in order to display line segments connecting communicating hosts is depicted. First, a test 1102 is made to determine if the captured information packet represents a new connection between a transmitting and a receiving host. If this is the case (decision path 1104), the new connection between hosts is inserted into the network data base (processing box 1105). The new connection is then displayed on the display device as a line segment connecting the transmitting and receiving hosts computers. If the captured information packet does not represent a new connection (decision path 1103), control drops to processing box 1106 without inserting the new connection into the network data base. At processing box 1106, the intensity of the connection line segment is incremented to represent active information traffic flow on that particular connection (processing box 1106). Inactive connections are removed from the display after a time out period in processing box 1107. Control then returns in termination box 1108.

Although this invention has been shown in relation to a particular embodiment, it should not be considered so limited. Rather, it is limited only by the appended claims.

What is claimed is:

1. In a computer display system connected to a computer network, said computer display system having a processor, a display device coupled to said processor, and a network interface coupled to said processor, said network interface coupling said computer display system to said computer network, said computer network connecting a plurality of host computers in a particular topology, a process for displaying on said display device a graphical representation of said network and information transfer activity occurring between said host computers of said network, said process comprising the steps of:

generating a geometric shape substantially resembling a circular shape, said geometric shape representing said network of host computers, each of said host computers being associated with a unique position on said geometric shape;

arranging said unique positions associated with said host computers in a substantially circular arrangement on or near the perimeter of said geometric shape;

displaying said arrangement on said display device;

receiving one of one or more information packets transmitted on said network by one of said host computers;

decoding information contained in said received information packet;

compiling a database containing database entries which include said information contained in said received information packet and traffic data indicating the amount of data being transferred between said host computers; and displaying said information transfer activity with said arrangement on said display device by displaying an indicia on said arrangement indicating data being transferred between said host computers when data is transferred between said host computers, wherein the appearance of said indicia is related to said traffic data contained in said database entries.

2. The process as claimed in claim 1 further including the step of:

displaying a line segment on said display device connecting two of said unique positions associated with said host computers in response to said information obtained in said decoding step, said information indicating information transfer activity between said host computers associated with said two of said unique positions, the location of said line segment corresponding to said information obtained in said decoding step.

3. The process as claimed in claim 1 wherein said arranging step further includes:

arranging said unique positions associated with said host computers in an even distribution on or near the perimeter of said circle.

4. The process as claimed in claim 1 wherein said arranging step further includes:

summing the number of host computers in said network;

calculating the dimensions of a polygon, said polygon having a number of sides equaling a multiple of two times the sum calculated in said summing step; and arranging said unique positions associated with said host computers in an even distribution on or near the perimeter of said polygon.

5. A process according to claim 1, wherein the step of displaying said arrangement on said display device further comprises indicating the amount of information being transferred among said host computers.

6. A process according to claim 1 wherein the step of displaying said arrangement on said display device further comprises displaying only active host computers.

7. A process according to claim 1 wherein said appearance of said indicia is modified periodically, the frequency of said modifications being determined by a predetermined period, and the degree of said modification corresponding to said traffic data.

8. In a computer display system connected to a computer network, said computer display system having a processor, a display device coupled to said processor, and a network interface coupled to said processor, said network interface coupling said computer display system to said computer network, said computer network connecting a plurality of host computers in a particular topology, a process for displaying on said display device a graphical representation of said network and information transfer activity occurring between said host computers of said network, said process comprising the steps of:

generating one or more geometric shapes each substantially resembling a circular shape, each of said one or more geometric shapes representing a sub-network of said network of host computers, each of said host computers that are members of a particular sub-network being associated with a unique position on or near the perimeter of the geometric shape representing said particular sub-network;

arranging said one or more geometric shapes in a substantially circular arrangement;

displaying said arrangement on said display device;

receiving one of one or more information packets transmitted on said network by one of said host computers;

decoding information contained in said received information packet;

compiling a database containing database entries which include said information contained in said received information packet and traffic data indicating the amount of data being transferred between said host computers; and displaying said information transfer activity with said arrangement on said display device by displaying an indicia on said arrangement indicating data being transferred between said host computers when data is transferred between said host computers, wherein the appearance of said indicia is related to said traffic data contained in said database entries.

9. The process as claimed in claim 8 further including the step of:

displaying a line segment on said display device connecting two of said unique positions associated with said host computers in response to said information obtained in said decoding step, said information indicating information transfer activity between said host computers associated with said two of said unique positions, the location of said line segment corresponding to said information obtained in said decoding step.

10. The process as claimed in claim 9 wherein said line segment connects any two of said positions associated with said host computers and is displayed while information packets are being transferred between said host computers associated with said positions connected by said line segment.

11. The process as claimed in claim 9 wherein said line segment connecting two of said positions associated with said host computers is removed when information packets cease being transferred between said host computers associated with said positions connected by said line segment.

12. The process as claimed in claim 9 wherein said line segment connecting said two of said unique positions associated with said host computers is displayed with a distinct particular color, said distinct particular color depending upon the quantity of information being transferred between said host computers associated with said positions connected by said line segment.

13. The process as claimed in claim 9 wherein said line segment connecting said two of said unique positions associated with said host computers is displayed with a distinct particular line width, said distinct particular line width depending upon the quantity of information being transferred between said host computers associated with said two of said unique positions connected by said line segment.

14. The process as claimed in claim 9 wherein said line segment connecting said two of said unique positions associated with said host computers is displayed with distinct characteristics, said distinct characteristics depending upon the quantity of information packets transferred between said host computers associated with said two of said unique positions connected by said line segment.

15. The process as claimed in claim 9 wherein said line segment connecting said two of said unique positions associated with said host computers is displayed with distinct characteristics, said distinct characteristics depending upon the quantity of bytes of information transferred between said host computers associated with said two of said unique positions connected by said line segment.

16. The process as claimed in claim 9 wherein said line segment connecting said two of said unique positions associated with said host computers is displayed with distinct characteristics, said distinct characteristics depending upon a network protocol being used to transfer information packets between said host computers associated with said two of said unique positions connected by said line segment.

17. The process as claimed in claim 9 wherein said arranging step further comprises labeling said geometric shapes with distinct labels according to names associated with said geometric shapes, and wherein said displaying step further comprises displaying said labels in association with said geometric shapes.

18. The process as claimed in claim 9 wherein said line segment is displayed only if said information obtained from said information packet in said decoding step corresponds to a selected network protocol.

19. The process as claimed in claim 9 wherein said geometric shapes and said line segment are displayed as an image within a window on said display device.

20. The process as claimed in claim 19 wherein a particular portion of said image can be selectively zoomed such that portions of said image other than said particular portion are not visible.

21. The process as claimed in claim 19 wherein said image can be selectively moved horizontally such that portions of said image are not visible.

22. The process as claimed in claim 19 wherein said image can be selectively moved vertically such that portions of said image are not visible.

23. The process as claimed in claim 9 wherein said geometric shapes and said line segment are displayed as a first image within a first window on said display device simultaneously with a second image displayed within a second window on said display device, said second image being a reduced scale representation of said first image.

24. The process as claimed in claim 8 wherein said arranging step further includes:
calculating the dimensions of a circle; and
arranging said geometric shapes representing sub-networks in an even distribution on said circle.

25. The process as claimed in claim 8 wherein said arranging step further includes:
summing the number of geometric shapes associated with sub-networks of said network;
calculating the dimensions of a polygon, said polygon having a number of sides equaling a multiple of two times the sum calculated in said summing step; and
arranging said geometric shapes representing sub-networks in an even distribution on or near the perimeter of said polygon.

26. The process as claimed in claim 8 wherein said geometric shapes representing sub-networks of said network are multi-sided polygons.

27. The process as claimed in claim 8 wherein said arranging step further includes:
calculating the dimensions of a circle; and
arranging said geometric shapes representing sub-networks and shapes representing individual host computers in an even distribution on said circle.

28. The process as claimed in claim 8 wherein said arranging step further includes:
summing the number of geometric shapes associated with sub-networks of said network with the number of shapes representing individual host computers;
calculating the dimensions of a polygon, said polygon having a number of sides equaling a multiple of two times the sum calculated in said summing step; and
arranging said geometric shapes representing sub-networks and shapes representing individual host computers in an even distribution on or near the perimeter of said polygon.

29. The process as claimed in claim 8 wherein said geometric shapes are displayed with distinct characteristics, said distinct characteristics depending upon whether at least one said host computer associated with said geometric shape is active or inactive.

30. The process as claimed in claim 8 wherein said positions associated with said host computers are displayed with distinct characteristics, said distinct characteristics depending upon whether said host computer associated with each said position is active or inactive.

31. The process as claimed in claim 8 wherein said arranging step further comprises labeling said positions associated with said host computers according to names of said host computers associated with said positions, and wherein said displaying step further comprises displaying said labels in association with said positions associated with said host computers.

32. The process as claimed in claim 8 wherein said arranging step further comprises labeling said positions associated with said host computers with distinct labels according to network addresses of said host computers associated with said positions, and wherein said displaying step further comprises displaying said labels in association with said positions associated with said host computers.

33. The process as claimed in claim 8 further including the steps of:
receiving an identification of one of said host computers associated with one of said geometric shapes;

searching said network for the presence of a host computer with an identification matching said identification received in said receiving step;

modifying the display of one of said geometric shapes associated with said host computer identified in said receiving step if said host computer is found in said searching step.

34. The process as claimed in claim 8 further including the steps of:

receiving an identification of one of said geometric shapes;

selectively deleting from said display device said geometric shape identified in said receiving step.

35. The process as claimed in claim 8 further including the steps of:

receiving an identification of one of said host computers associated with one of said geometric shapes;

selectively deleting from said display device said host computer identified in said receiving step.

36. The process as claimed in claim 8 further including the steps of:

receiving at least one information packet sent on said network by one of said host computers;

decoding information contained in said at least one information packet;

displaying a first line segment on said display device connecting a position associated with a first host computer with a position associated with a second host computer, said first host computer and said second host computer being associated with the same geometric shape, said second host computer being a gateway for said sub-network of which said first host computer and said second host computer are members, said geometric shape associated with both said first host computer and said second host computer representing said sub-network;

displaying a second line segment on said display device connecting a position associated with said second host computer with a position associated with a third host computer, said second host computer and said third host computer being associated with a different geometric shape, the location of said first and said second line segments corresponding to the information obtained in said decoding step.

37. A process according to claim 8, wherein the step of displaying said arrangement on said display device further comprises indicating the amount of information being transferred among said host computers.

38. A process according to claim 8 wherein the step of displaying said arrangement on said display device further comprises displaying only active host computers.

39. A process according to claim 8 wherein said appearance of said indicia is modified periodically, the frequency of said modifications being determined by a predetermined period, and the degree of said modification corresponding to said traffic data.

40. In a computer display system connected to a computer network, said computer display system having a processor, a display device coupled to said processor, and a network interface coupled to said processor, said network interface coupling said computer display system to said computer network, said computer network connecting a plurality of host computers in a particular topology, a computing device for displaying on said display device a graphical representation of said network and information transfer activity occurring between said host computers of said network, said computing device comprising:

means for generating a geometric shape substantially resembling a circular shape, said geometric shape representing said network of host computers, each of said host computers being associated with a unique position on said geometric shape;

means for arranging said unique positions associated with said host computers in a substantially circular arrangement on or near the perimeter of said geometric shape;

means for displaying said arrangement on said display device;

means for receiving one of one or more information packets transmitted on said network by one of said host computers;

means for decoding information contained in said received information packet;

means for compiling a database containing database entries which include said information contained in said received information packet and traffic data indicating the amount of data being transferred between said host computers; and means for displaying said information transfer activity with said arrangement on said display device by displaying an indicia on said arrangement indicating data being transferred between said host computers when data is transferred between said host computers, wherein the appearance of said indicia is related to said traffic data contained in said database entries.

41. The computing device as claimed in claim 40 further comprising:

means for displaying a line segment on said display device connecting two of said unique positions associated with said host computers in response to said information obtained in said decoding step, said information indicating information transfer activity between said host computers associated with said two of said unique positions, the location of said line segment corresponding to said information obtained in said decoding step.

42. The computing device as claimed in claim 40 wherein said arranging means further comprises:

means for arranging said unique positions associated with said host computers in an even distribution on or near the perimeter of said circle.

43. The computing device as claimed in claim 40 wherein said arranging means further comprises:

means for summing the number of host computers in said network;

means for calculating the dimensions of a polygon, said polygon having a number of sides equaling a multiple of two times the sum calculated in said summing step; and means for arranging said unique positions associated with said host computers in an even distribution on or near the perimeter of said polygon.

44. A process according to claim 40, wherein the step of displaying said arrangement on said display device further comprises indicating the amount of information being transferred among said host computers.

45. A process according to claim 40 wherein the step of displaying said arrangement on said display device further comprises displaying only active host computers.

46. A computing device according to claim 40 wherein said appearance of said indicia is modified periodically, the frequency of said modifications being determined by a predetermined period, and the degree of said modification corresponding to said traffic data.

47. In a computer display system connected to a computer network, said computer display system having a processor, a display device coupled to said processor, and a network interface coupled to said processor, said network interface coupling said computer display system to said computer network, said computer network connecting a plurality of host computers in a particular topology, a computing device for displaying on said display device a graphical representation of said network and information transfer activity occurring between said host computers of said network, said computing device comprising:

means for generating one or more geometric shapes each substantially resembling a circular shape, each of said one or more geometric shapes representing a sub-network of said network of host computers, each of said host computers that are members of a particular sub-network being associated with a unique position on or near the perimeter of the geometric shape representing said particular sub-network;

means for arranging said one or more geometric shapes in a substantially circular arrangement;

means for displaying said arrangement on said display device;

means for receiving one of one or more information packets transmitted on said network by one of said host computers;

means for decoding information contained in said received information packet;

means for compiling a database containing database entries which include said information contained in said received information packet and traffic data indicating the amount of data being transferred between said host computers; and means for displaying said information transfer activity with said arrangement on said display device by displaying an indicia on said arrangement indicating data being transferred between said host computers when data is transferred between said host computers, wherein the appearance of said indicia is related to said traffic data contained in said database entries.

48. The computing device as claimed in claim 47 further comprising:

means for displaying a line segment on said display device connecting two of said unique positions associated with said host computers in response to said information obtained in said decoding step, said information indicating information transfer activity between said host computers associated with said two of said unique positions, the location of said line segment corresponding to said information obtained in said decoding step.

49. The computing device as claimed in claim 48 wherein said line segment connects any two of said positions associated with said host computers and is displayed while information packets are being transferred between said host computers associated with said positions connected by said line segment.

50. The computing device as claimed in claim 48 wherein said line segment connecting two of said positions associated with said host computers is removed when information packets cease being transferred between said host computers associated with said positions connected by said line segment.

51. The computing device as claimed in claim 48 wherein said line segment connecting said two of said unique positions associated with said host computers is displayed with a distinct particular color, said distinct particular color depending upon the quantity of information being transferred between said host computers associated with said positions connected by said line segment.

52. The computing device is claimed in claim 48 wherein said line segment connecting said two of said unique positions associated with said host computers is displayed with a distinct particular line width, said distinct particular line width depending upon the quantity of information being transferred between said host computers associated with said two of said unique positions connected by said line segment.

53. The computing device as claimed in claim 48 wherein said line segment connecting said two of said unique positions associated with said host computers is displayed with distinct characteristics, said distinct characteristics depending upon the quantity of information packets transferred between said host computers associated with said two of said unique positions connected by said line segment.

54. The computing device as claimed in claim 48 wherein said line segment connecting said two of said unique positions associated with said host computers is displayed with distinct characteristics, said distinct characteristics depending upon the quantity of bytes of information transferred between said host computers associated with said two of said unique positions connected by said line segment.

55. The computing device as claimed in claim 48 wherein said line segment connecting said two of said unique positions associated with said host computers is displayed with distinct characteristics, said distinct characteristics depending upon a network protocol being used to transfer information packets between said host computers associated with said two of said unique positions connected by said line segment.

56. The computing device as claimed in claim 48 wherein said arranging means further comprises labeling said geometric shapes with distinct labels according to names associated with said geometric shapes, and wherein said displaying step further comprises displaying said labels in association with said geometric shapes.

57. The computing device as claimed in claim 48 wherein said line segment is displayed only if said information obtained from said information packet in said decoding step corresponds to a selected protocol.

58. The computing device as claimed in claim 48 wherein said geometric shapes and said line segment are displayed as an image within a window on said display device.

59. The computing device as claimed in claim 58 wherein a particular portion of said image can be selectively zoomed such that portions of said image other than said particular portion are not visible.

60. The computing device as claimed in claim 58 wherein said image can be selectively moved horizontally such that portions of said image are not visible.

61. The computing device as claimed in claim 58 wherein said image can be selectively moved vertically such that portions of said image are not visible.

62. The computing device as claimed in claim 48 wherein said geometric shapes and said line segment are displayed as a first image within a first window on said display device simultaneously with a second image displayed within a second window on said display device, said second image being a reduced scale representation of said first image.

63. The computing device as claimed in claim 47 wherein said arranging means further comprises:

means for calculating the dimensions of a circle; and means for arranging said geometric shapes representing sub-networks in an even distribution on said circle.

64. The computing device as claimed in claim 47 wherein said arranging means further comprises:
  means for summing the number of geometric shapes associated with sub-networks of said network;
  means for calculating the dimensions of a polygon, said polygon having a number of sides equaling a multiple of two times the sum calculated in said summing step; and
  means for arranging said geometric shapes representing sub-networks in an even distribution on or near the perimeter of said polygon.

65. The computing device as claimed in claim 47 wherein said geometric shapes representing sub-networks of said network are multi-sided polygons.

66. The computing device as claimed in claim 47 wherein said arranging step further comprises:
  means for calculating the dimensions of a circle; and
  means for arranging said geometric shapes representing sub-networks and shapes representing individual host computers in an even distribution on said circle.

67. The computing device as claimed in claim 47 wherein said arranging means further comprises:
  means for summing the number of geometric shapes associated with sub-networks of said network with the number of shapes representing individual host computers;
  means for calculating the dimensions of a polygon, said polygon having a number of sides equaling a multiple of two times the sum calculated in said summing step; and
  means for arranging said geometric shapes representing sub-networks and shapes representing individual host computers in an even distribution on or near the perimeter of said polygon.

68. The computing device as claimed in claim 47 wherein said geometric shapes are displayed with distinct characteristics, said distinct characteristics depending upon whether at least one said host computer associated with said geometric shape is active or inactive.

69. The computing device as claimed in claim 47 wherein said positions associated with said host computers are displayed with distinct characteristics, said distinct characteristics depending upon whether said host computer associated with each said position is active or inactive.

70. The computing device as claimed in claim 47 wherein said arranging means further comprises labeling said positions associated with said host computers with distinct labels according to names of said host computers associated with said positions, and wherein said displaying step further comprises displaying said labels in association with said positions associated with said host computers.

71. The computing device as claimed in claim 47 wherein said arranging means further comprises labeling said positions associated with said host computers with distinct labels according to network addresses of said host computers associated with said positions, and wherein said displaying step further comprises displaying said labels in association with said positions associated with said host computers.

72. The computing device as claimed in claim 47 further comprising:
  means for receiving an identification of one of said host computers associated with one of said geometric shapes;
  means for searching said network for the presence of a host computer with an identification matching said identification received in said receiving step;
  means for modifying the display of one of said geometric shapes associated with said host computer identified in said receiving step if said host computer is found in said searching step.

73. The computing device as claimed in claim 47 further comprising:
  means for receiving an identification of one of said geometric shapes;
  means for selectively deleting from said display device said geometric shape identified in said receiving step.

74. The computing device as claimed in claim 47 further comprising:
  means for receiving an identification of one of said host computers associated with one of said geometric shapes;
  means for selectively deleting from said display device said host computer identified in said receiving step.

75. The computing device as claimed in claim 47 further comprising:
  means for receiving at least one information packet sent on said network by one of said host computers;
  means for decoding information contained in said at least one information packet;
  means for displaying a first line segment on said display device connecting a position associated with a first host computer with a position associated with a second host computer, said first host computer and said second host computer being associated with the same geometric shape, said second host computer being a gateway for said sub-network of which said first host computer and said second host computer are members, said geometric shape associated with both said first host computer and said second host computer representing said sub-network;
  means for displaying a second line segment on said display device connecting a position associated with said second host computer with a position associated with a third host computer, said second host computer and said third host computer being associated with a different geometric shape, the location of said first and said second line segments corresponding to the information obtained in said decoding step.

76. A process according to claim 47, wherein the step of displaying said arrangement on said display device further comprises indicating the amount of information being transferred among said host computers.

77. A process according to claim 47 wherein the step of displaying said arrangement on said display device further comprises displaying only active host computers.

78. A computing device according to claim 47 wherein said appearance of said indicia is modified periodically, the frequency of said modifications being determined by a predetermined period, and the degree of said modification corresponding to said traffic data.

79. In a computer display system connected to a computer network, said computer display system having a processor, a display device coupled to said processor, and a network interface coupled to said processor, said network interface coupling said computer display system to said computer network, said computer network connecting a plurality of host computers in a particular topology, a process for displaying on said display device a graphical representation of said network and information transfer activity occurring between said host computers of said network, said process comprising the steps of:
  generating a geometric shape substantially resembling a circular shape, said geometric shape representing said network of host computers, each of said host computers being associated with a unique position on said geometric shape;

arranging said unique positions associated with said host computers in a substantially circular arrangement on or near the perimeter of said geometric shape;

displaying said arrangement on said display device;

receiving one of one or more information packets transmitted on said network by one of said host computers;

decoding information contained in said received information packet; and displaying said information transfer activity with said arrangement on said display device by displaying an indicia on said arrangement indicating data being transferred between said host computers when data is transferred between said host computers.

* * * * *